US008276761B2

United States Patent
Kujawa

(10) Patent No.: US 8,276,761 B2
(45) Date of Patent: Oct. 2, 2012

(54) FROTH FLOTATION METHOD AND APPARATUS, A FROTH FLOTATION METHOD AND APPARATUS FOR EXTRACTING BITUMEN FROM A SLURRY OF WATER AND OIL SAND, AND USE OF THE APPARATUS

(75) Inventor: Christian Kujawa, Highlands Ranch, CO (US)

(73) Assignee: OUTOTEC OYJ, Espoo (FI)

( * ) Notice: Subject to any disclaimer, the term of this patent is extended or adjusted under 35 U.S.C. 154(b) by 642 days.

(21) Appl. No.: 12/497,042

(22) Filed: Jul. 2, 2009

(65) Prior Publication Data

US 2010/0059415 A1 Mar. 11, 2010

Related U.S. Application Data

(60) Provisional application No. 61/094,469, filed on Sep. 5, 2008.

(51) Int. Cl.
*B03D 1/14* (2006.01)
*B03D 1/16* (2006.01)
*B03D 1/20* (2006.01)
*C10G 1/00* (2006.01)
*C10G 1/04* (2006.01)

(52) U.S. Cl. ........ 209/164; 209/168; 209/169; 208/390; 208/425

(58) Field of Classification Search .................. 209/164, 209/168, 169; 208/390, 425
See application file for complete search history.

(56) References Cited

U.S. PATENT DOCUMENTS

| 4,161,444 | A | * | 7/1979 | Moore | 209/169 |
|---|---|---|---|---|---|
| 4,172,025 | A | * | 10/1979 | Porteous et al. | 208/425 |
| 4,776,949 | A | * | 10/1988 | Leung et al. | 208/390 |
| 2003/0173262 | A1 | | 9/2003 | Jounela | |
| 2004/0129621 | A1 | | 7/2004 | Kujawa | |
| 2007/0090025 | A1 | | 4/2007 | Strand | |
| 2010/0059415 | A1 | * | 3/2010 | Kujawa | 209/165 |

FOREIGN PATENT DOCUMENTS

JP 8290160 A 11/1996
JP 11057690 A 3/1999

OTHER PUBLICATIONS

Marja Tamminen, International Search Report and Written Opinion for PCT/FI2009/050686, Jan. 8, 2010.

* cited by examiner

*Primary Examiner* — Thomas M Lithgow
(74) *Attorney, Agent, or Firm* — Chernoff, Vilhauer, McClung & Stenzel LLP

(57) ABSTRACT

A froth flotation method and apparatus for extracting a valuable substance from a slurry comprising a mixture of solid phase, liquid phase and said substance. A gas dispersing mechanism (4) feeds gas into the slurry (1) in a flotation vessel (2) to infuse gas bubbles into the slurry. The slurry is agitated in the flotation vessel (2) for dispersing the gas bubbles into the slurry. The gas bubbles capture the valuable substance from the slurry and form a froth phase F above the slurry phase S. The froth phase F exits the vessel by overflow. Continuously moving negative pressure zones (7) are mechanically generated by rake blades (9) in the froth phase (F). The negative pressure zones (7) extend from the froth phase (F) to the slurry phase (S). The negative pressure zones (7) capture unwanted slurry and liquid pockets (8) entrained from the slurry phase to the froth phase (F) and form paths for guiding said unwanted slurry and liquid pockets (8) via said paths from the froth phase (F) downwardly back to the slurry phase (S).

7 Claims, 2 Drawing Sheets

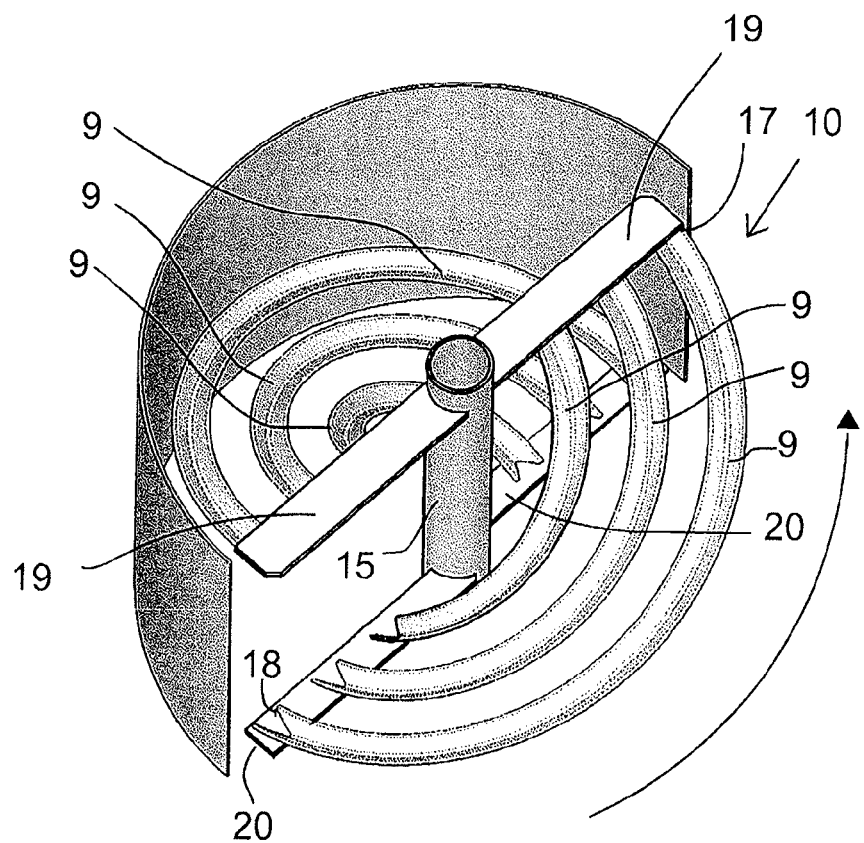
Fig. 2
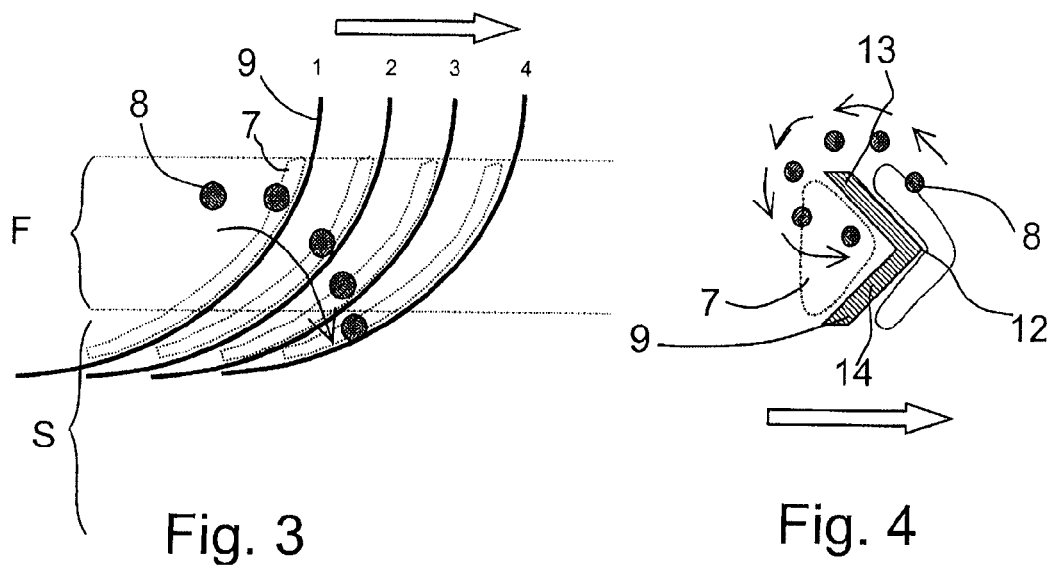
Fig. 3
Fig. 4

FROTH FLOTATION METHOD AND APPARATUS, A FROTH FLOTATION METHOD AND APPARATUS FOR EXTRACTING BITUMEN FROM A SLURRY OF WATER AND OIL SAND, AND USE OF THE APPARATUS

CROSS-REFERENCE TO RELATED APPLICATION

This application claims benefit under 35 USC 119 of Provisional Application No. 61/094,469 filed Sep. 5, 2008.

FIELD OF THE INVENTION

The present invention relates to a froth flotation method and apparatus and its use. In particular, the present invention relates to a novel and improved method and apparatus for extracting bitumen from a slurry of water and oil sand containing bitumen.

BACKGROUND OF THE INVENTION

In conventional flotation methods and apparatuses a valuable substance is extracted from a slurry comprising a mixture of solid phase, liquid phase and said substance. Gas is fed into the slurry in a flotation vessel to infuse gas bubbles into the slurry while the slurry is agitated in the flotation vessel for dispersing the gas bubbles into the slurry. When the particles of the valuable substance come to contact with the gas bubbles they are attached to the bubbles and rise upwards to the surface of the slurry to form a foam bed (herein called as a froth phase) above the free surface of the slurry (slurry phase). The froth can then be removed from the vessel by overflow for further processing.

In the known methods and apparatuses there is a common problem of the entrainment of slurry and liquid pockets, i.e. impurities, from the slurry phase into froth phase. These impurities may exit from the flotation vessel together with the froth overflow causing inefficiency in separation.

OBJECT OF THE INVENTION

The object of the present invention is to overcome the above-mentioned drawbacks.

Accordingly, it is an object of the present invention to reduce the entrainment of slurry and liquid pockets into the froth phase.

Another object of the present invention is to provide the flotation method the apparatus with a mechanical means to return the entrained unwanted slurry and liquid pockets from the froth phase back to the slurry phase.

Still another object of the invention is to improve the separation efficiency.

In particular, a special object of the invention is to provide an improved froth flotation method and apparatus for extracting bitumen from a slurry of water and oil sand.

SUMMARY OF THE INVENTION

The foregoing and other objects are achieved in accordance with the teachings of the present invention through the provision of a new and improved froth flotation method for extracting a valuable substance from a slurry comprising a mixture of solid phase, liquid phase and said substance. The method includes the steps of delivering gas into the slurry in a flotation vessel to infuse gas bubbles into the slurry; agitating the slurry in the flotation vessel for dispersing the gas bubbles into the slurry said gas bubbles capturing said substance from the slurry and forming a froth phase above the slurry phase said froth phase to be removed from the vessel by overflow; and mechanically generating continuously moving negative pressure zones in the froth phase in the flotation vessel before the overflow, said zones extending from the froth phase to the slurry phase and said zones capturing unwanted slurry and liquid pockets entrained from the slurry phase to the froth phase and forming paths for guiding said unwanted slurry and liquid pockets via said paths from the froth phase downwardly back to the slurry phase.

Further, the present invention concerns a froth flotation method for extracting bitumen from a slurry of water and oil sand containing bitumen the method including the steps of delivering air into the slurry in a flotation vessel to infuse air bubbles into the slurry; agitating the slurry in the flotation vessel for dispersing the air bubbles into the slurry said gas bubbles capturing the hydrophobic bitumen from the slurry and forming a froth phase above the slurry phase, said froth to be removed from the vessel by overflow; and mechanically generating continuously moving negative pressure zones in the froth phase in the flotation vessel before the overflow, said zones extending from the froth phase to the slurry phase and said zones capturing unwanted slurry and water pockets entrained from the slurry phase to the froth phase and forming paths for guiding said unwanted slurry and water pockets via said paths from the froth phase downwardly back to the slurry phase.

Moreover, the invention concerns an apparatus for extracting a valuable substance from a slurry comprising a mixture of solid phase, liquid phase and said substance, the apparatus comprising: a flotation vessel having means for feeding slurry into the flotation vessel; a gas dispersion mechanism for delivering gas into the slurry to infuse gas bubbles into the slurry said gas bubbles being for capturing said substance from the slurry and forming a froth phase above the slurry phase; means for removing froth from the flotation vessel by overflow; and means for mechanically generating continuously moving negative pressure zones in the froth phase in the flotation vessel before the overflow so that the negative pressure zones generated by said means extend from the froth phase to the slurry phase and so that said negative pressure zones capture unwanted slurry and liquid pockets entrained from the slurry phase to the froth phase and form paths for guiding said unwanted slurry and liquid pockets via said paths from the froth phase downwardly back to the slurry phase.

The invention has the advantage that it makes it possible to reduce the entrainment of unwanted slurry into the froth phase by a very simple mechanical means. Thus, the further advantage of the invention is that the separation efficiency is improved.

Another object of the present invention is to provide the flotation method the apparatus with a mechanical means to return the entrained unwanted slurry and liquid pockets from the froth phase back to the slurry phase.

In an embodiment of the method the negative pressure zones are generated by rotating sloped rake blades in the froth phase the negative pressure zones being formed behind the rake blades by the movement of the rake blades through the froth phase.

In an embodiment of the method the slurry is a mixture of oil sand as the solid phase and water as the liquid phase and said substance to be extracted is bitumen which is bound in the oil sand grains.

In an embodiment of the apparatus the means for mechanically generating continuously moving negative pressure zones comprises a plurality of sloped rake blades aid rake blades extending partly in the froth phase and partly in the slurry phase, and means for rotating said rake blades to form the negative pressure zones behind the rake blades by the movement of the rake blades through the froth phase.

In an embodiment of the apparatus the means for mechanically generating continuously moving negative pressure zones includes a helical rotor having a plurality of said rake blades each rake blade having a spiral shape twisted around a vertical center axis of rotation and the rake blades being arranged at different radial distances from the center axis of rotation.

In an embodiment of the apparatus the helix angle of the outermost rake blades are selected to be about 30°, the inner rake blades having greater helix angles.

In an embodiment of the apparatus the rake blades have a V-shaped cross section having a tip and two legs extending from the tip, said tip being directed in the direction of rotation and the negative pressure zones being formed between the legs as the helical rotor is rotated in the froth phase.

In an embodiment of the apparatus the spiral rake blades twist around the center axis of rotation through half of a turn.

In an embodiment of the apparatus the helical rotor comprises a vertical shaft connected to a power means and having a center axis of rotation; two identical sets of rake blades each set having at least two, preferably more, spiral rake blades with different helix angles and radial distances from the center axis of rotation, each of the said rake blade having an upper end and a lower end, each set of rake blades twisting around the center axis of rotation and said sets being arranged at opposite sides of a vertical plane at the center axis of rotation; upper horizontal supporting arms fixed to the vertical shaft and extending at opposite directions from the vertical shaft and the upper ends of the rake blades being fixed to the upper supporting arms; and lower horizontal supporting arms fixed to the vertical shaft at a distance from the upper horizontal supporting arms and extending at opposite directions from the vertical shaft and the lower ends of the rake blades being fixed to the lower supporting arms.

In an embodiment of the apparatus the gas dispersion mechanism comprises a gas dispersing rotor having gas ducts for dispersing gas into the slurry, said rotor being arranged to rotate near the bottom of the flotation vessel, said rotor being connected via a vertical rotation axle to the power means; and the vertical shaft of the helical rotor being fixed to said rotation axle for rotation along with the gas dispersing rotor.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 2 is a perspective view of a helical rotor of the flotation apparatus of FIG. 1 for generating negative pressure zones in froth behind the rake blades while the rotor, FIG. 3 shows a side view of one rake blade in four different positions during its movement through the froth phase and upper part of the slurry phase and the propagation path of the entrained slurry and liquid pocket, and FIG. 4 shows a cross section of one embodiment of the rake blade and the path of the propagation of the entrained the propagation path of the entrained slurry and liquid pockets during the movement of the rake blade.

DETAILED DESCRIPTION OF THE PREFERRED EMBODIMENT

Figure 1:
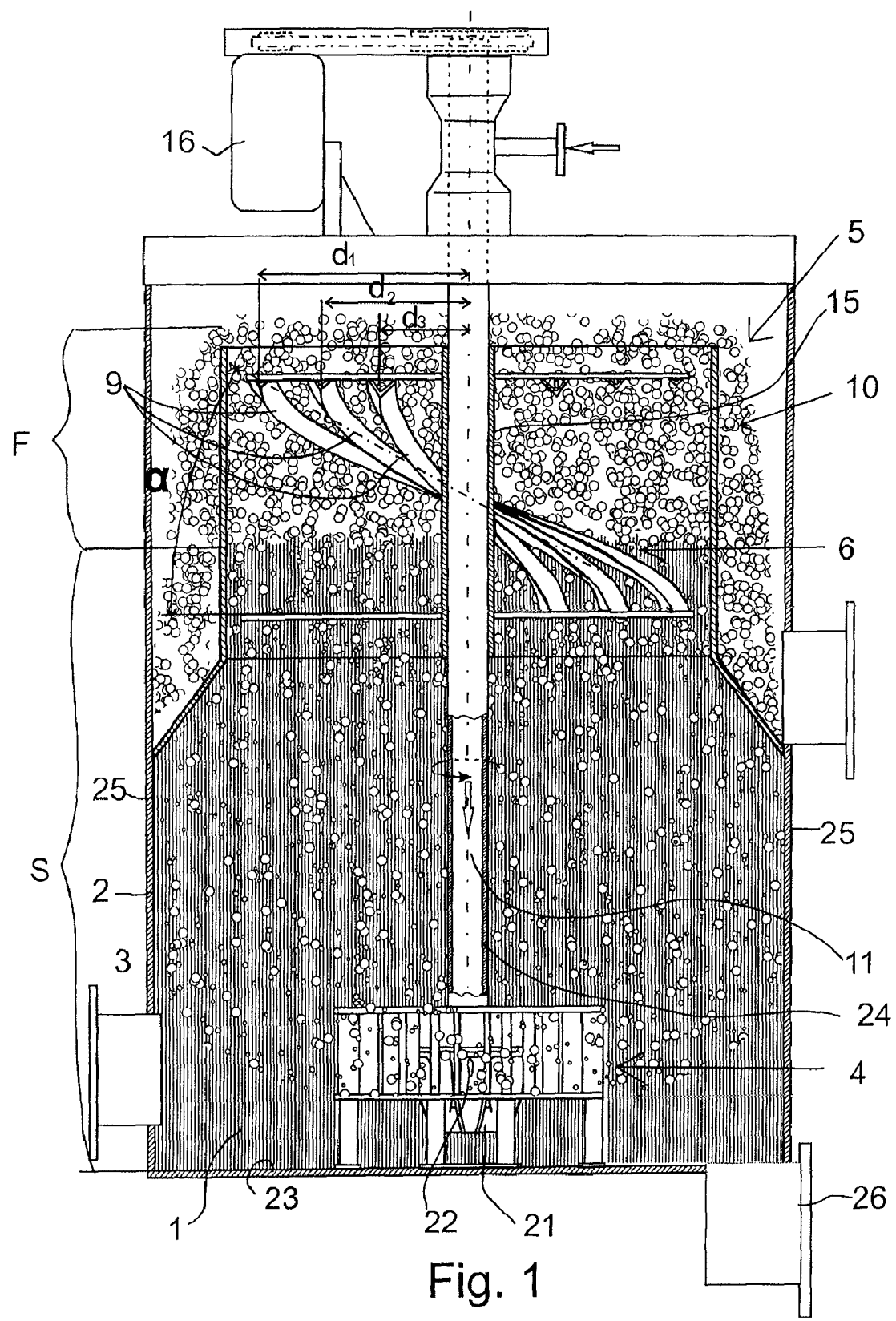
FIG. 1 is a diagrammatic view in vertical section of one embodiment of the froth flotation apparatus of the invention.

FIG. 1 shows a froth flotation apparatus configured to process slurry 1 in order to extract a valuable substance, such as minerals or oil in the form of bitumen or the like, from the slurry. A special use of the apparatus to which, however, the apparatus is not limited is in the field of extracting bitumen bound in the oil sand grains from a slurry which is a mixture of oil sand as the solid phase and water as the liquid phase.

The flotation apparatus comprises flotation vessel 2 formed by side walls 25 and a bottom wall 23. The inlet 3 is arranged at the side wall 25 for feeding slurry 1 into the vessel 2. The apparatus also includes an outlet 26 for discharging the processed slurry and sludge. The apparatus further includes gas dispersion mechanism 4 arranged to feed gas, for example air, into the slurry to infuse gas bubbles into the slurry. In FIG. 1 the slurry 1 and the slurry phase S are shown with vertical hatching. The bubbles rise above the surface of the slurry phase S to form a froth phase F.

The gas dispersing mechanism 4 includes a gas dispersing rotor 21 having gas ducts 22 for dispersing gas into the slurry. The gas dispensing rotor 21 is arranged to rotate in the vicinity of the bottom 23 of the flotation vessel 2. The rotor 21 is connected via vertical rotation axle 24 to power means 16, such as an electric motor, which is arranged to rotate the rotation axle 24. The rotation axle 24 is a hollow tube for guiding flotation gas to the rotor 21. The rotor 21 agitates the slurry and simultaneously feeds gas to form the bubbles.

It should be noted that the invention is not limited to the gas dispersing mechanism shown in FIG. 1. The gas dispersing mechanism can be any known suitable gas dispersing mechanism which is able to form gas bubbles to the slurry.

The upper portion of the vessel 2 at the region where the froth phase F is formed the side wall ends at a free edge forming an overflow means 5 over which the froth can overflow to be removed from the flotation vessel for further processing.

The apparatus further includes means 6 for mechanically generating continuously moving negative pressure zones 7 (see also FIGS. 2 to 4) in the froth phase F in the flotation vessel 2 before the froth exits to the overflow discharge. This is achieved by a plurality of sloped rake blades 9 arranged in the helical rotor 10. The helical rotor 10 has a vertical shaft 15 which is fixed to the rotation axle 24 of the gas dispersing rotor 21 so that they both rotate at the same speed around the same center axis of rotation 11. In some other embodiment it is also possible to arrange a separate rotation mechanism to rotate the helical rotor 10. Two identical sets of spiral shaped rake blades 9 are arranged to the helical rotor 10. The spiral rake blades 9 twist around the center axis of rotation 11 through half of a turn. The rake blades 9 extend in the froth phase F and partly into the slurry phase S. Each set has three spiral rake blades 9 which have different helix angles and radial distances $d_1$, $d_2$, $d_3$ from the center axis of rotation 11. As can be seen from FIG. 1, the helix angle α of the outermost rake blades are selected to be about 30°, the two inner rake blades having helix angles greater than 30°.

As shown I FIG. 2, each rake blade 9 has an upper end 17 and a lower end 18. The two sets of rake blades 9 are arranged at opposite sides of an imaginary vertical plane placed at the center axis of rotation 11. The helical rotor 10 includes two upper horizontal supporting arms 19 which are fixed to the vertical shaft 15 and extend at opposite directions from the vertical shaft 15. The upper ends 17 of the rake blades 9 are fixed to these upper supporting arms 19. The helical rotor 10 also includes lower horizontal supporting arms 20 fixed to the vertical shaft 15 at a distance from the upper horizontal supporting arms 19. Similarly the lower horizontal supporting arms 20 extend at opposite directions from the vertical shaft 15 and the lower ends 18 of the rake blades 9 are fixed to the lower supporting arms 20.

As can be seen from FIG. 4, the rake blade 9 has a V-shaped cross section having a tip 12 and two legs 13, 14 extending from the tip 12. The tip 12 is directed to the direction of rotation and the legs 13, 14 extend away from direction of rotation at an angle.

FIGS. 3 and 4 show the working principle of the rake blades 9 in action. It functions on the principle of differential pressure gradient created by the rake blade 9 as it moves through the froth phase F. As the rake blade 9 moves in the froth phase F a positive pressure zone is formed in front of the rake blade 9 and a negative pressure or suction zone 7 is formed behind the rake blade 9 between the legs 13, 14 as the helical rotor 10 is rotated in the froth phase F.

As illustrated in FIG. 3, the negative pressure zones extend from the froth phase F to the slurry phase S. The negative pressure zones 7 capture unwanted slurry and liquid pockets 8 entrained from the slurry phase S to the froth phase F. The negative pressure zone 7 forms a path to guide the unwanted slurry and liquid pockets 8 from the froth phase F downwardly back to the slurry phase S. In FIG. 3 there is shown a rake blade 9 in four successive positions during its movement through the froth phase and a path of one slurry and liquid pocket 8. The unwanted pocket 8 gravitationally descends from the froth phase F along the negative pressure zone 7 to the slurry phase S to prevent it from entering the overflow with froth. The unwanted pockets 8 are hereby given a definitive channel in which their movement back into the slurry phase is ensured. The slope of the rake blade 9 ensures that the suction zone moves continuously downward.

Obviously, many modifications and variations of the present invention are possible in light of the above teachings. It is therefore to be understood that within the scope of the appended claims, the present invention may be practiced otherwise than as specifically described herein.

The invention claimed is:

1. An apparatus for extracting a valuable substance from a slurry comprising a mixture of solid phase, liquid phase and said substance, the apparatus comprising:
    a flotation vessel having an inlet feeding slurry into the flotation vessel;
    a gas dispersion mechanism for delivering gas into the slurry to infuse gas bubbles into the slurry said gas bubbles being for capturing said substance from the slurry and forming a froth phase above the slurry phase;
    means for removing froth from the flotation vessel by overflow; and
    means for mechanically generating continuously moving negative pressure zones in the froth phase in the flotation vessel before the overflow so that the negative pressure zones extend from the froth phase to the slurry phase and so that said negative pressure zones capture unwanted slurry and liquid pockets entrained from the slurry phase to the froth phase and form paths for guiding said unwanted slurry and liquid pockets via said paths from the froth phase downwardly back to the slurry phase,
    wherein the means for mechanically generating continuously moving negative pressure zones comprises
    a helical rotor having a plurality of sloped rake blades extending in the froth phase and partly into the slurry phase, each rake blade having a spiral shape twisted around a vertical center axis of rotation and the rake blades being arranged at different radial distances from the center axis of rotation, and
    means for rotating said rake blades whereby the negative pressure zones are formed behind the rake blades by the movement of the rake blades through the froth phase.

2. The apparatus of claim 1 wherein the helix angle ($\alpha$) of the outermost rake blades are selected to be about 30°, the inner rake blades having helix angles greater than 30°.

3. The apparatus of claim 1 wherein the rake blade has a V-shaped cross section having a tip and two legs extending from the tip, said tip being directed in the direction of rotation and the negative pressure zone being formed between the legs as the helical rotor is rotated in the froth phase.

4. The apparatus of claim 1 wherein the spiral rake blades twist around the center axis of rotation through half of a turn.

5. The apparatus of any claim 1 wherein the helical rotor comprises
    a vertical shaft connected to a power means and having a center axis of rotation;
    two identical sets of rake blades each set having at least two, preferably three, spiral rake blades with different helix angles and radial distances from the center axis of rotation, each of the said rake blade having an upper end and a lower end, each set of rake blades twisting around the center axis of rotation and said sets being arranged at opposite sides of an imaginary vertical plane placed at the center axis of rotation;
    upper horizontal supporting arms fixed to the vertical shaft and extending at opposite directions from the vertical shaft and the upper ends of the rake blades being fixed to the upper supporting arms; and
    lower horizontal supporting arms fixed to the vertical shaft at a distance from the upper horizontal supporting arms and extending at opposite directions from the vertical shaft and the lower ends of the rake blades being fixed to the lower supporting arms.

6. The apparatus of claim 1 wherein the gas dispersion mechanism comprises a gas dispersing rotor having gas ducts for dispersing gas into the slurry, said rotor being arranged to rotate in the vicinity of the bottom of the flotation vessel, said rotor being connected via a vertical rotation axle to a power means; and the vertical shaft of the helical rotor being fixed to said rotation axle to rotate along with the gas dispersing rotor.

7. A method for extracting bitumen from a slurry of water and oil sand containing bitumen, comprising employing the apparatus of claim 1.

* * * * *